United States Patent [19]

Trimble et al.

[11] 4,059,942

[45] Nov. 29, 1977

[54] COTTON HARVESTER

[75] Inventors: David Lee Trimble, Polk City; Russell Dean Copley; James Keith Jensen, both of Ankeny; Francis Edward Schlueter, Des Moines, all of Iowa

[73] Assignee: Deere & Company, Moline, Ill.

[21] Appl. No.: 597,102

[22] Filed: July 18, 1975

[51] Int. Cl.² .............................................. A01D 46/08
[52] U.S. Cl. ........................................ 56/30; 56/13.3;
298/17 S; 298/18
[58] Field of Search ................ 298/17 R, 17 S, 17 B, 298/1 R, 8 H, 10, 18; 214/77, 83, 28, 83.3, 508; 56/30, 13.3

[56] References Cited

U.S. PATENT DOCUMENTS

| 2,697,005 | 12/1954 | Hagen et al. | 298/18 |
| 3,083,059 | 3/1963 | Biszantz | 298/17 S |
| 3,419,168 | 12/1968 | Isbell et al. | 214/83.28 |
| 3,712,675 | 1/1973 | Schoenwald | 298/17 S |

Primary Examiner—Russell R. Kinsey

[57] ABSTRACT

A means of stabilizing a cotton harvester during the basket dump operation by providing a hydraulic cylinder between the support for the rear steering wheels and the frame of the harvester and providing a valve that is actuated when the basket raises for dumping so as to trap fluid in the cylinder thereby rigidifying the connection between the frame and the support for the steerable wheels.

8 Claims, 5 Drawing Figures

COTTON HARVESTER

BACKGROUND OF THE INVENTION

In the past cotton harvesters have been provided with a main frame mounted on a pair of front traction wheels and a pair of rear steerable wheels that generally track the front wheels. The rear steerable wheels are connected to the frame by means of a transverse wheel support extending between the steerable wheels and which is pivotally connected to the frame about a fore-and-aft extending horizontal axis. Consequently, the frame is normally supported or stabilized on the two front traction wheels and the fore-and-aft extending axis on the rear wheel carriage. There is also carried on the front of the frame harvesting mechanism which feeds to a basket carried directly over the wheels. Cotton is accumulated in the basket. The basket is supported to pivot about a fore-and-aft extending horizontal axis alongside of the frame so that a truck moving alongside the harvester will be in position for receiving cotton that is being discharged from the basket. There is normally provided a lid for the basket which opens as the basket is tipped to the side and consequently there tends to be an overbalancing of the entire unit on this side.

In the past, the harvester was properly stabilized by the two front wheels and the third connection about the fore-and-aft pivot between the rear steering wheel carriage and the frame. In recent years however, the overall width of a harvester has increased primarily because the front harvesting units have been increased in number to extend considerably outboard of the wheels in order to harvest additional rows of cotton. A truck, to be in position alongside a cotton harvester with the additional width, must be spaced a further distance from the frame in order to avoid contact with the outer harvesting unit. Consequently, the fore-and-aft extending pivot about which the basket rocks has had to be moved further outward so that the basket when it is dumping will discharge into the truck. This, of course, places the weight of the basket, its lid, and the material in the basket further outward with respect to the fore-and-aft center line of the implement when the basket is shifted to dumping position. Thus, there has been created an unstable condition and there is a tendency for the entire harvester to tilt or turn over.

SUMMARY OF THE INVENTION

With the above in mind it is a primary object of the present invention to provide a cylinder between the harvester frame and the rear wheel carriage which in normal operation of the harvester is freely extendable and retractable. Provided on the harvester is a valve that is connected to the stabilizing cylinder which is responsive to raising of the basket to lock the fluid in the cylinder to thereby rigidify the frame with the rear wheel carriage and to thereby eliminate during the cotton discharging operation pivoting between the frame and the rear wheel carriage.

In one form of the invention, the valve for the stabilizing cylinder is connected with the tilt cylinder of the receptacle or the basket so that when fluid is introduced into the tilt cylinders, the valve is shifted and fluid is locked in the stabilizing cylinder. In a second form of the invention there is provided a solenoid controlled valve which locks fluid in the stabilizing cylinder. The swith for the solenoid valve is controlled by movement of the basket to and from its seated or operating position on the cotton harvester. In this form as the basket is raised the switch closes and locks the solenoid valve in a position that fluid will not be permitted to leave the stabilizing cylinder. As the basket is returned to its normal seated position on the frame, the solenoid valve is opened so that fluid flows freely to and from the stabilizing cylinder.

DESCRIPTION OF THE PREFERRED EMBODIMENT

Figure 1:
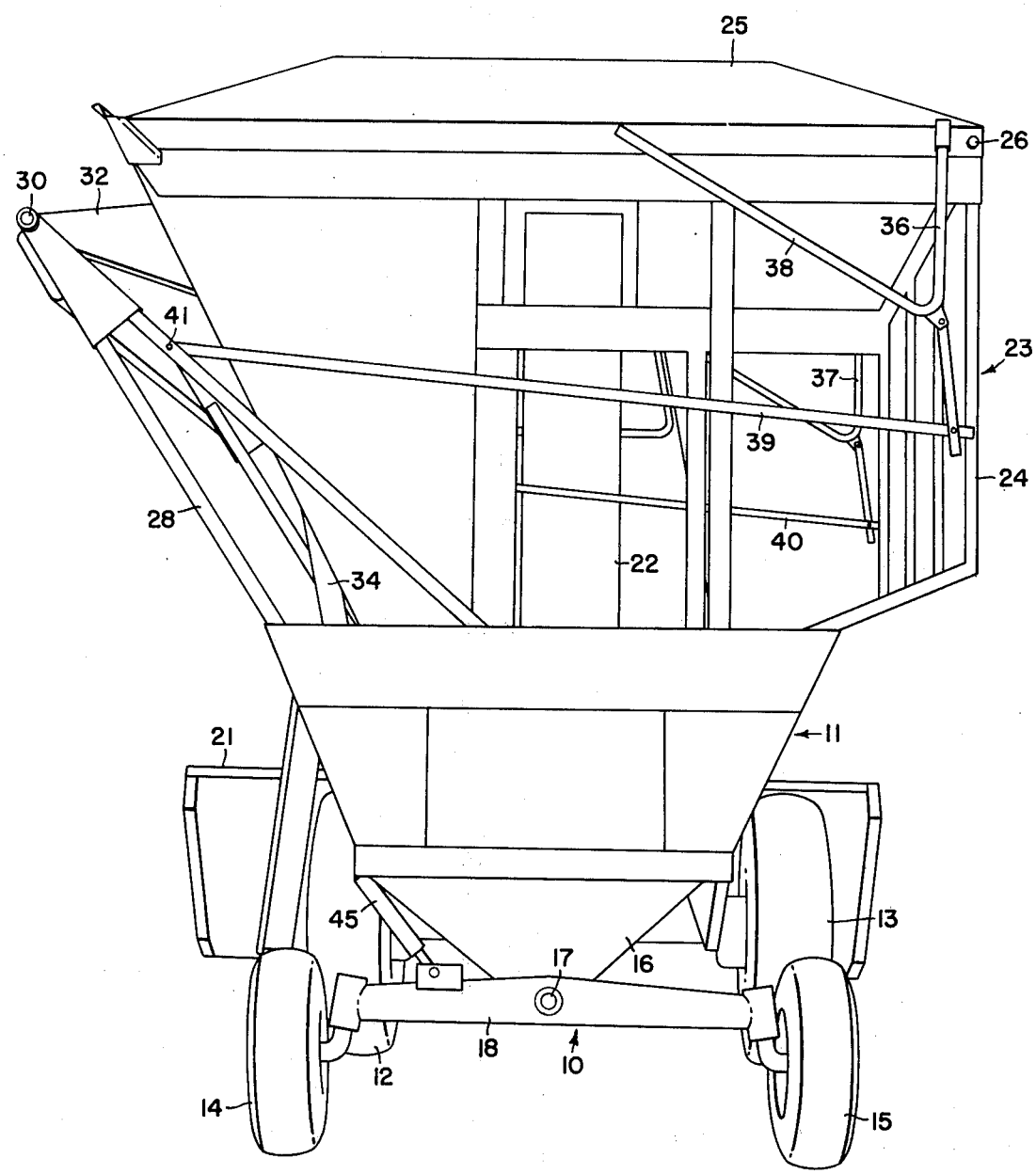
FIG. 1 is a rear view of the cotton harvester incorporating the stabilizing cylinder of the present invention.
Figure 2:
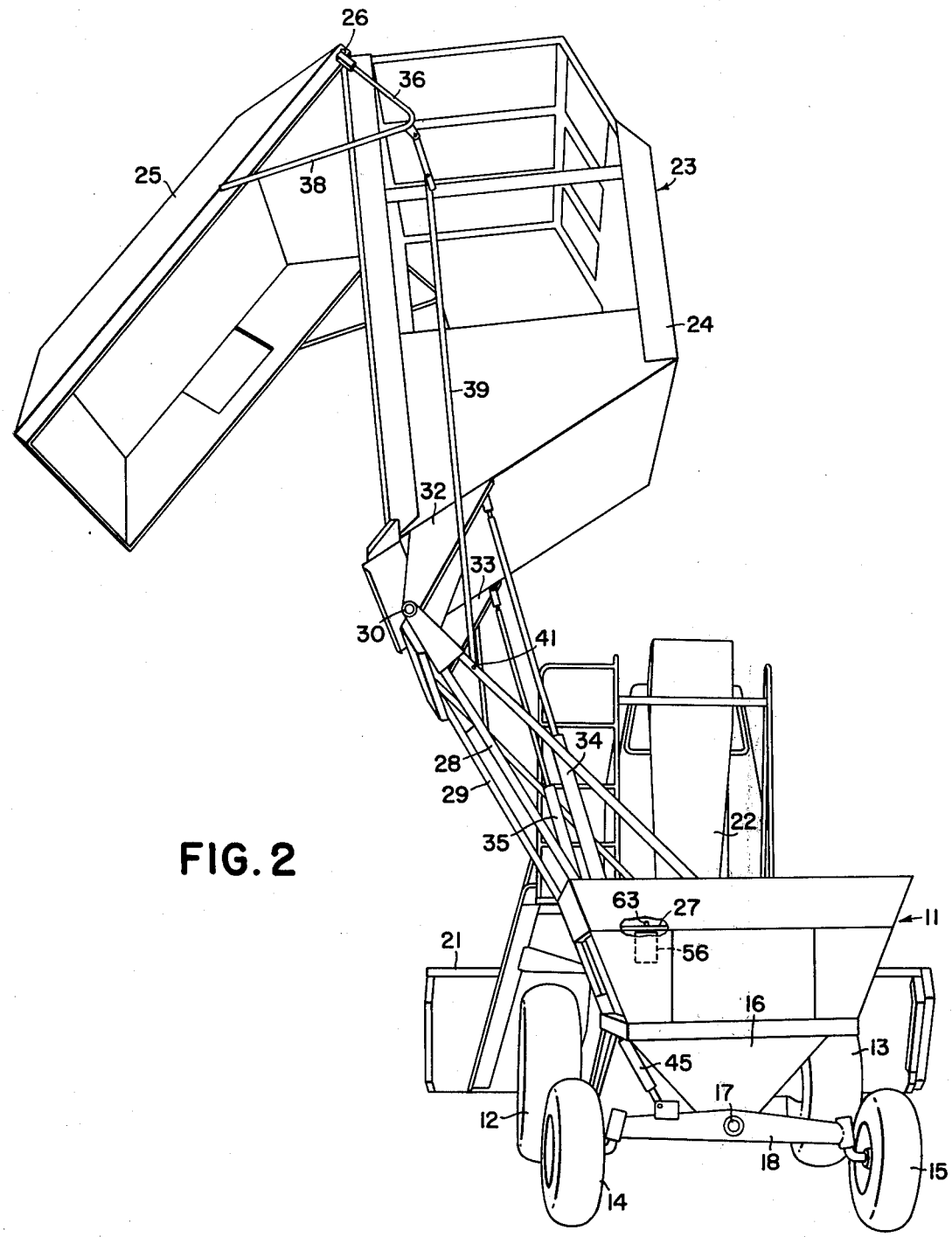
FIG. 2 is a view similar to FIG. 1 but showing the cotton basket or receptacle in a discharge position on the harvester. A portion has been broken away to indicate the location of a control valve.
Figure 3:
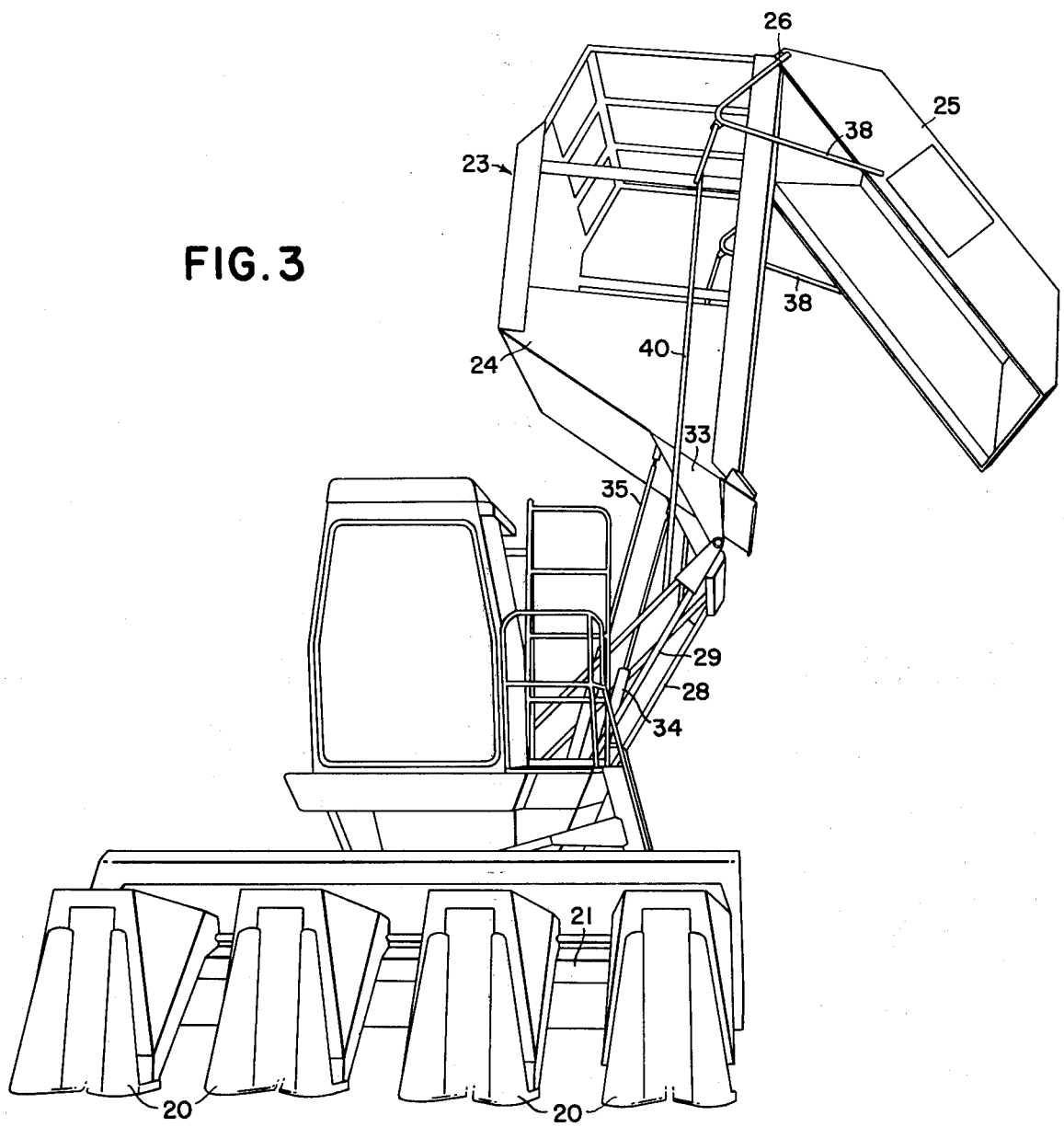
FIG. 3 is a front elevation of the harvester in its discharged position as shown in FIG. 2.

Referring now to FIG. 1-3, a cotton harvester is composed of a tractor 10 comprising a main frame 11 carried on a pair of front traction wheels 12, 13 and a pair of rear steerable wheels 14, 15. The frame 11 is rigid with the main axle structure extending across the front end of the tractor and between the traction wheels 12, 13. The frame 11 carries at its rear end a depending transverse triangular shape frame portion 16 having its apex portion directed downwardly and carrying at its apex portion a fore-and-aft extending horizontal pivot pin 17. A transverse wheel support 18 is carried at its central point on the pivot pin 17 and extends outwardly therefrom to the steerable wheels 14, 15. The wheels 14, 15 may, therefore, pivot vertically about the pivot pin 17 in accordance with the ground contour over which the wheels are traveling.

The frame 11 carries at its forward end four forwardly projecting harvesting row units 20 that detaches cotton from the respective rows of cotton plants as the harvester advances and feeds the cotton to a rear transversely disposed auger conveyor mechanism 21. The auger mechanism 21 feeds centrally to a lower end of a duct 22. A blower, not shown, moves the cotton through the duct 22 into a container or receptacle, indicated in its entirety by the reference numeral 23. The basket or receptacle is composed of a lower portion 24 and an upper lid portion 25. The bottom 24 and lid 25 are pivotally conected at 26 so that the lid may swing about a fore-and-aft horizontal axis. The frame 11 is provided with a horizontal plate portion 27 on which the lower basket portion 24 of the basket may rest when in its normal operating position. The frame 11 also has at its rear and front ends outwardly and upwardly projecting frame sections 28, 29 which come to apex portions and carry a fore-and-aft extending horizontal tube 30 defining a fore-and-aft extending horizontal pivot. The tube or pivot 30, as may be seen in FIG. 2, is outward of the wheels 12, 14 and is also positioned outwardly of the outermost row unit 20 on that side of the harvester. The basket portion 24 carries at its rear and front ends a pair of triangular shaped brackets 32, 33 that project outwardly from the basket 24 and are connected at their outermost points to the pivot rod 30. Thus, the basket 23, as may be seen in FIGS. 2 and 3 may swing from a normal operating position in which the basket portion 24 sits upon the plates 27 and a discharge position in which the basket portion 24 is swung upwardly and over the pivot or tube 30.

Provided on the frame 11 and extending between the frame 11 and left side of the basket portion 24 is a pair of vertically extending hydraulic cylinders 34, 35. The cylinders 34, 35 raise and lower the basket between its normal position as shown in FIG. 1 and its discharge position as shown in FIGS. 2 and 3. Fixed to the lid adjacent the front and rear walls and offset just inwardly of the pivot 26 are depending arms 36, 37.

Braces 38 extend from a midportion of the arms to the basket lid 25. Connected to the lower end of the arms 36, 37 are transversely extending links 39, 40. The left ends of the links 39, 40 are connected to the respective frame structures 28, 29 beneath the pivot tube 30 by bolts 41. As may best be seen in viewing FIGS. 1 and 2, the links 39, 40 pull on the respective arms 36, 37 when the basket is swung upwardly over the pivot tube 30. This causes the lid 25 to open automatically when the basket moves over the tube 30 so that cotton may be discharged from the basket.

When harvesting from four rows of cotton it is necessary to provide a relatively large basket or receptacle 23 and considerable weight is often carried in the basket 23. The pivot tube 30 must be positioned considerably outwardly of the traction wheels 12, 13 and steerable wheels 14, 15 so that a truck or other cotton carrying implements may move alongside and be positioned to receive cotton gravitating from the basket without interference with the outermost row unit 20. This, of course, creates a relatively unstable position of the frame 11 and the basket 23 during the unloading operation. In order to stabilize the frame 11 with respect to the front traction and the rear steering wheels during the unloading operation, a stabilizing cylinder 45 is provided between the left rearwardmost portion of the frame 11 and the wheel support 18. When the cylinder 45 is locked against extension and retraction the wheel support 18 is locked against pivotal movement with respect to the frame 11 and consequently the point of fore-and-aft pivot between the rearwardmost end of the frame 11 is shifted from the fore-and-aft extending pivot 17 to the rear wheel 14. Thus, when unloading, additional stabilization of the entire harvester is provided by locking the cylinder 45 so that it operates as a strut.

Figure 4:
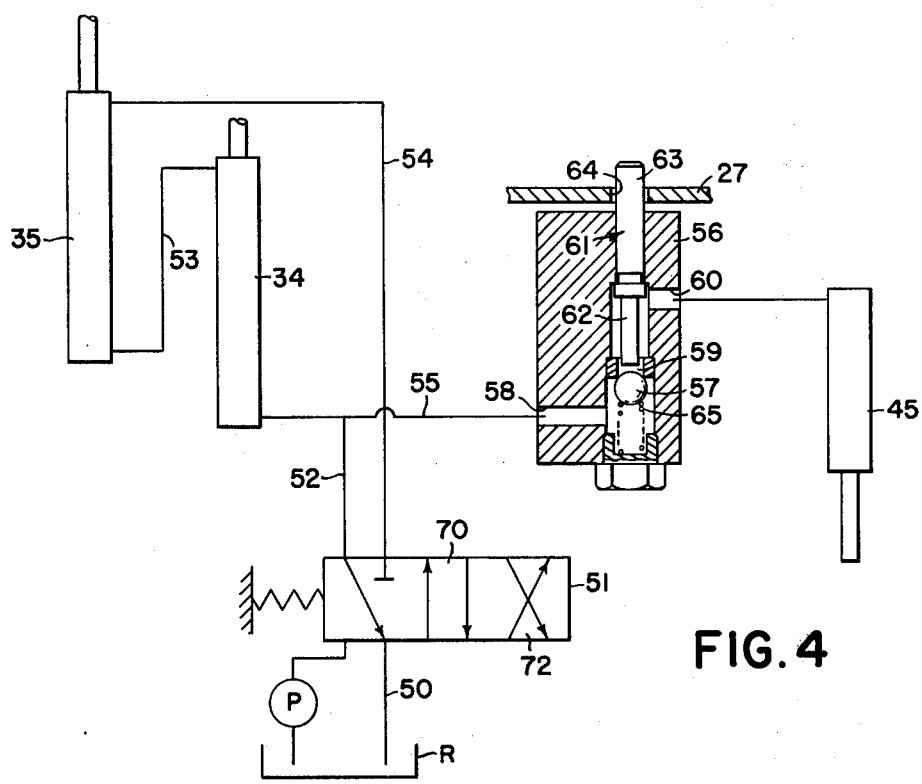
FIG. 4 is a schematic view of the valve and hydraulic systems incorporated in the cotton harvester.

The cylinder 45 is locked in response to raising of the basket 23 to its dump or unload position. The hydraulic system for providing such arrangement is shown in FIG. 4. It consist of a reservoir R, a pump P, and a return line 50 that leads to and from a variable manually operated control valve 51. The two basket cylinders 34, 35 are connected in series so that they will operate in unison. A line 52 leads from the main valve 51 to the discharge end of the cylinder 34 on a line 53 leads from the rod end of the cylinder 34 to the head end of the cylinder 35. A return line 54 extends from the rod ends of the cylinder 35 back to the valve 51. Extending from the line 52 is a line 55 that extends to a control valve 56 for the stabilizing cylinder 45. The valve 56 is a one-way valve having a ball 57 that is spring loaded to seat against a shoulder and closes an orifice 59 that leads from the inlet 58 to the outlet 60. A plunger 61 has its lower end 62 engageable with the ball 57 for purposes of unseating it. The plunger 61 also has an external upwardly projecting portion 63 that extends through the floor panel 27, a suitable opening 64 being provided for such. The check valve 57 is held in place by a spring 65. In normal operation, however, when the basket 23 is resting on the plate 27, the weight of the basket forces the plunger 61 downwardly to unseat the valve 57. Thus, in normal operation when the basket is seated the plunger 61 is down and there is free flow of fluid from the upper end of the cylinder 45 to the line 55 and through the valve 51 to the return line 50.

When it is desired to dump the basket 23 by extending the cylinders 34, 35 the valve 51 is shifted to a valve dumping position indicated by the two arrows 70 which pressurizes the lines 52, 55. Pressurizing the line 52 will cause the cylinder 34, 35 to raise the basket slightly so that the plunger 61 may move upwardly so that the check valve 57 may seat against its shoulder. The pressure in the line 55 will insure that the valve remains seated. This will prevent fluid from leaving the cylinder 45 and thus the stabilizing cylinder 45 is in a locked position. When it is desired in a lower position for refilling, the valve 51 is moved so that fluid moves in a direction of the arrows indicated at 72 and from the line 52 to the reservoir line 50 and from the pump to the line 54. This will cause the basket to seat which will again engage the plunger 61 to cause the check valve 57 to unseat. Thus in its return movement the basket causes the stabilizer cylinder 45 to be free flowing.

Figure 5:
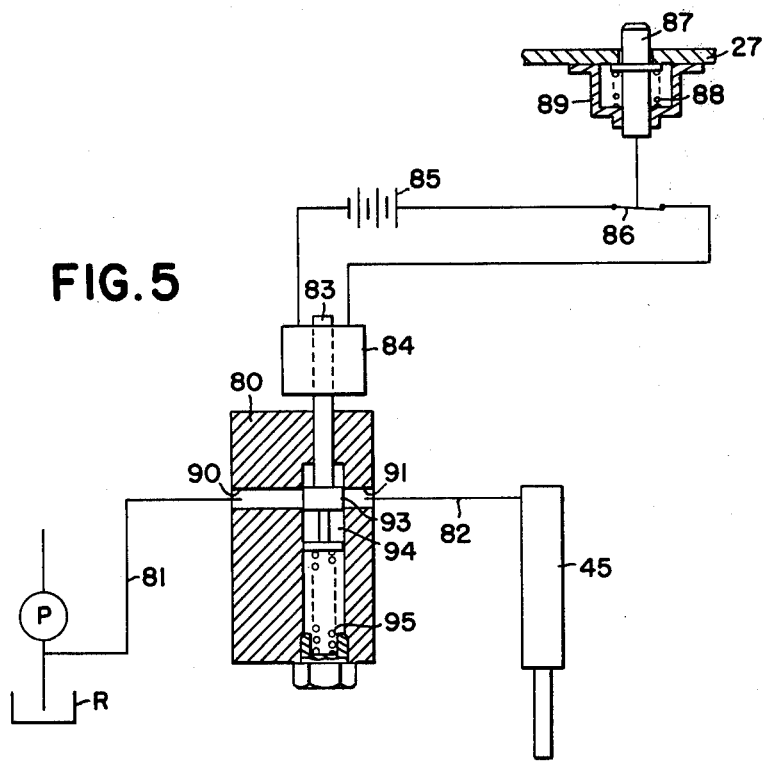
FIG. 5 is a schematic view showing a modified form of the invention.

In the modified form of the invention shown in FIG. 5, there is provided a valve 80. A line 81 extends from a line leading from the pump to the inlet 90 of the valve 80 and a line 82 extends from the dischage 91 to the stabilizing cylinder 34. An .internal spool 92 having an external end 83 projecting from the valve 80 is controlled by a solenoid 84 that receives power from a 12-volt battery 85 on the tractor. A switch 86 is contained in the line from the battery 85 to the solenoid 84. The switch 86 is controlled by a vertical rod 87 that projects upwardly through the lower panel 27 and is spring loaded at 88 to be biased so as to project upwardly from the plate 27. A suitable bracket 89 mounted on the underside of the floor plate 27 guides the rod 87.

The spool 92 has a land portion 93 for blocking fluid flow between the inlet 90 and the outlet 91 and a groove 94 that permits flow. A spring 95 biases the spool to its uppermost position.

When the basket 23 is seated, the rod 87 is forced downwardly to retain the switch 86 at an open position to thus deenergize the solenoid 84. This permits the spool 92 to move vertically by the force of spring 95 so as to permit free flow of fluid through the valve 80 between the stabilizing cylinder 34 and the reservoir R. However, when the basket 34 is raised, the rod 87 is raised by spring 88 and closes the switch 86. This energizes the solenoid 84 so as to lower the plunger spool and position land 93 so as to prevent flow of fluid through the valve 80 to thereby lock the stabilizing cylinder 45 against extension and retraction.

We claim:

1. In a cotton harvesting implement having a main frame carried on a pair of transversely spaced traction wheels at its forward end and a pair of transversely spaced steerable wheels at its other end, with the former wheels being mounted on the frame by a transversely elongated wheel support rigid with the frame, and the latter wheels being mounted on the frame by a transversely elongated rigid wheel support pivotally mounted at its center on the frame on a fore-and-aft extending horizontal axis, harvesting devices supported on the frame forward of the front traction wheels and having a transverse expanse greater than the transverse expanse of the wheels; structure on the frame defining a fore-and-aft extending pivot above and outboard of the wheels, and a cotton receptacle supported on the frame above the front and rear wheels and shiftable about the pivot defined by the structure between an inboard position in which the receptacle is generally inboard of the pivot and above the wheels and a discharge position in which the receptacle is over the pivot and a large portion thereof is outboard of the pivot; power means for shifting the receptacle between inboard and discharge positions; a hydraulic cylinder extending between the wheel support for the steerable wheels and the frame normally permitting free relative vertical movement between the support and frame; a hydraulic control for said cylinder actuated upon the power means shifting the receptacle toward said discharge position to lock the cylinder againt extension or retraction and upon returning the receptacle to its inboard position making the cylinder freely extensible and retractable.

2. In a cotton harvesting implement having a main frame carried on a pair of transversely spaced traction wheels at one end and a pair of transversely spaced steerable wheels at its other end, with at least one pair of wheels being mounted on the frame by a transversely elongated rigid wheel support pivotally mounted at its center on the frame on a fore-and-aft extending horizontal axis, harvesting devices supported on and projecting forwardly of the frame; structure on the frame defining a fore-and-aft extending pivot above the wheels and offset to one side of the frame, and a cotton receptacle supported on the frame above the wheels and shiftable about the pivot defined by the structure between an inboard position in which the receptacle is generally inboard of the pivot and above the wheels and a discharge position in which the receptacle is above the pivot and with at least a large portion thereof outboard of the pivot and wheels; power means for shifting the receptacle between inboard and discharge positions; a hydraulic cylinder extending between said wheel support for the steerable wheels and the frame normally permitting free vertical movement between the frame and wheel support; a hydraulic control for said cylinder actuated upon the power means shifting the receptacle toward said discharge position to lock the cylinder against extension or retraction and upon returning the receptacle to its inboard position making the cylinder freely extensible and retractable.

3. The invention defined in claim 2 in which the hydraulic control is a check valve for blocking fluid moving to and from the cylinder and which is unseated by a plunger with an extenal portion; and said external portion is operatively controlled by the receptacle so that when the latter is in its inboard position the check valve is unseated.

4. The invention defined in claim 3 in which the plunger is vertically disposed and is engageable with the receptacle when it moves to its inboard position.

5. The invention defined in claim 2 in which the hydraulic control is a solenoid operated check valve that is energized to prevent fluid moving to and from the cylinder upon the receptacle moving from its inboard position.

6. The invention defined in claim 5 in which the solenoid controlled valve is in an electrical circuit having a switch therein and said switch is operatively connected to the receptacle to close upon the receptacle moving toward its discharge position.

7. In a cotton harvesting implement having a main frame carried on a pair of transversely spaced traction wheels at its forward end and a pair of transversely spaced steerable wheels at its other end, with the former wheels being mounted on the frame by a transversely elongated wheel support rigid with the frame, and the latter wheels being mounted on the frame by a transversely elongated rigid wheel support pivotally mounted at its center on the frame on a fore-and-aft extending horizontal axis, a plurality of row unit harvesting devices supported on the frame forward of the front traction wheels and having a transverse expanse greater than the transverse expanse of the wheels with at least one row unit being outboard respectively of each of said traction wheels; structure on the frame defining a fore-and-aft extending pivot above and outboard of the wheels and generally aligned with the outermost extremity of the respective row unit that is outboard of the traction wheel, and a cotton receptacle supported on the frame above the front and rear wheels and shiftable about the pivot defined by the structure between an inboard position in which the receptacle is generally inboard of the pivot and above the wheels and a discharge position in which the receptacle is above the pivot and with at least a portion thereof outboard of the pivot; power means for shifting the receptacle between inboard and discharge positions; an hydraulic cylinder extending between the wheel support for the steerable wheels and the frame normally permitting free floating movement between the support and frame; a control for said hydraulic cylinder actuated upon the receptacle moving toward said discharge position to lock the wheel support and frame against relative movement and upon returning the receptacle to its inboard position to unlock the wheel support and frame to thereby permit relative movement.

8. In an implement having a main frame carried on a pair of transversely spaced traction wheels at its forward end and a pair of transversely spaced steerable wheels at its other end, with the former wheels being mounted on the frame by a transversely elongated wheel support rigid with the frame, and the latter wheels being mounted on the frame by a transversely elongated rigid wheel support pivotally mounted at its center on the frame on a fore-and-aft extending horizontal axis; structure on the frame defining a fore-and-aft extending pivot above an outboard of the wheels, and a receptacle supported on the frame above the front and rear wheels and shiftable about the pivot defined by the structure between an inboard position in which the receptacle is generally inboard of the pivot and above the wheels and a discharge position in which the receptacle is above the pivot and with at least a portion thereof outboard of the pivot; power means for shifting the receptacle between inboard and discharge positions; a hydraulic cylinder extending between the wheel support for the steerable wheels and the frame normally permitting free vertical movement between the support and wheels; and a valve actuable upon the receptacle moving from its inboard position to lock the cylinder against extension and retraction.

* * * * *